US011090725B2

(12) United States Patent
Gaignon et al.

(10) Patent No.: US 11,090,725 B2
(45) Date of Patent: *Aug. 17, 2021

(54) METHOD AND MACHINE FOR MANUFACTURING PIECES MADE OF CERAMIC OR METALLIC MATERIAL BY THE TECHNIQUE OF ADDITIVE MANUFACTURING

(71) Applicant: S.A.S 3DCeram-Sinto, Limoges (FR)

(72) Inventors: Richard Gaignon, Saint-Vrain (FR); Christophe Chaput, Le Palais-sur-Vienne (FR); Marc Nguyen, Le Vigen (FR)

(73) Assignee: S.A.S 3DCERAM-SINTO, Bonnac la Cote (FR)

( * ) Notice: Subject to any disclaimer, the term of this patent is extended or adjusted under 35 U.S.C. 154(b) by 236 days.

This patent is subject to a terminal disclaimer.

(21) Appl. No.: 15/999,028

(22) Filed: Aug. 20, 2018

(65) Prior Publication Data

US 2019/0054528 A1    Feb. 21, 2019

(30) Foreign Application Priority Data

Aug. 18, 2017 (FR) ...................................... 1770870

(51) Int. Cl.
  *B22F 3/00*  (2021.01)
  *B23K 26/362*  (2014.01)
  (Continued)

(52) U.S. Cl.
  CPC ............ *B22F 10/10* (2021.01); *B22F 1/0059* (2013.01); *B22F 3/11* (2013.01); *B22F 3/1115* (2013.01);
  (Continued)

(58) Field of Classification Search
  CPC .. B22F 3/008; B22F 3/11; B22F 7/002; B22F 2003/245; B22F 2003/247;
  (Continued)

(56) References Cited

U.S. PATENT DOCUMENTS 9,174,390 B2    11/2015    Lechmann et al.
9,545,669 B2    1/2017    Aklint et al.
(Continued)

FOREIGN PATENT DOCUMENTS

EP    3 045 148 A1    7/2016
JP    H10-044248 A    2/1998
(Continued)

OTHER PUBLICATIONS

French Search Report and Written Opinion, dated May 16, 2018, from corresponding French Application No. FR 1770870.

*Primary Examiner* — Rebecca Janssen
(74) *Attorney, Agent, or Firm* — Nixon & Vanderhye

(57) ABSTRACT

The disclosed method includes selecting a suspension ceramic or metal photocurable composition (CPC or MPC); preparing a sacrificial organic material (SOM) forming a photocurable layer destroyed by heating; for manufacturing pieces, on the working tray, forming successive layers of SOM cured by irradiation, the one or more CPC or MPC-based pieces being manufactured by machining a recess in a layer of cured SOM; depositing the CPC or MPC within the recesses; curing the CPC or MPC to obtain a hard horizontal surface level with the adjacent layer of cured SOM, when forming each recess, it is delimited by previously defined patterns, the depth(s) selected in order to ensure the continuity of the one or more pieces to be manufactured; and obtaining one or more green pieces
(Continued)

inserted in the SOM, which are subjected to debinding by heating in order to destroy the SOM in which they are trapped.

9 Claims, 4 Drawing Sheets

(51) Int. Cl.

| | | |
|---|---|---|
| C04B 35/634 | (2006.01) | |
| B22F 3/11 | (2006.01) | |
| B22F 7/00 | (2006.01) | |
| C04B 35/638 | (2006.01) | |
| B22F 7/06 | (2006.01) | |
| B23K 26/361 | (2014.01) | |
| B28B 1/00 | (2006.01) | |
| B22F 3/105 | (2006.01) | |
| B33Y 10/00 | (2015.01) | |
| B29C 64/194 | (2017.01) | |
| B22F 3/24 | (2006.01) | |
| B29C 64/188 | (2017.01) | |
| B22F 1/00 | (2006.01) | |
| C04B 35/626 | (2006.01) | |
| B33Y 30/00 | (2015.01) | |
| B22F 10/10 | (2021.01) | |
| B33Y 40/00 | (2020.01) | |
| B33Y 50/02 | (2015.01) | |

(52) U.S. Cl.
CPC ............ *B22F 3/1121* (2013.01); *B22F 7/002* (2013.01); *B22F 7/06* (2013.01); *B23K 26/361* (2015.10); *B23K 26/362* (2013.01); *B28B 1/001* (2013.01); *B33Y 30/00* (2014.12); *C04B 35/6269* (2013.01); *C04B 35/634* (2013.01); *C04B 35/638* (2013.01); *B22F 2003/245* (2013.01); *B22F 2003/247* (2013.01); *B29C 64/188* (2017.08); *B29C 64/194* (2017.08); *B33Y 10/00* (2014.12); *B33Y 40/00* (2014.12); *B33Y 50/02* (2014.12); *C04B 2235/6026* (2013.01); *C04B 2235/665* (2013.01)

(58) Field of Classification Search
CPC ............ B22F 2003/1058; B22F 3/1055; B22F 2003/1056; B22F 2003/1057; B22F 7/06; B22F 3/1121; B22F 3/1115; B22F 1/0059; B23K 26/361; B23K 26/362; B28B 1/001; B29C 64/194; B29C 64/188; C04B 2235/665; C04B 2235/6026; C04B 35/638; C04B 35/622; C04B 35/6269; C04B 35/634; B33Y 40/00; B33Y 50/02; B33Y 10/00; B33Y 50/00; B33Y 40/20; B33Y 30/00
See application file for complete search history.

(56) References Cited

U.S. PATENT DOCUMENTS

| | | |
|---|---|---|
| 9,944,020 B2 | 4/2018 | Lechmann et al. |
| 2004/0145629 A1 | 7/2004 | Silverbrook |
| 2012/0308837 A1* | 12/2012 | Schlechtriemen ........................... C04B 35/63424 428/446 |
| 2013/0193619 A1 | 8/2013 | Church et al. |
| 2015/0314530 A1 | 11/2015 | Rogren |
| 2017/0136693 A1 | 5/2017 | Okamoto et al. |
| 2017/0232516 A1 | 8/2017 | Das et al. |
| 2018/0236731 A1* | 8/2018 | Natarajan .............. B33Y 10/00 |
| 2019/0054529 A1* | 2/2019 | Gaignon ................ B33Y 70/00 |
| 2019/0177239 A1* | 6/2019 | Chaput ................. C04B 35/584 |

FOREIGN PATENT DOCUMENTS

| | | |
|---|---|---|
| JP | 2009-084619 A | 4/2009 |
| JP | 2014-529523 A | 11/2014 |
| JP | 2016-203425 A | 12/2016 |
| JP | 2016-221894 A | 12/2016 |
| JP | 2017-088967 A | 5/2017 |
| WO | 2013/030064 A1 | 3/2013 |

* cited by examiner

Fig.1
Fig.2
Fig.3
Fig.4
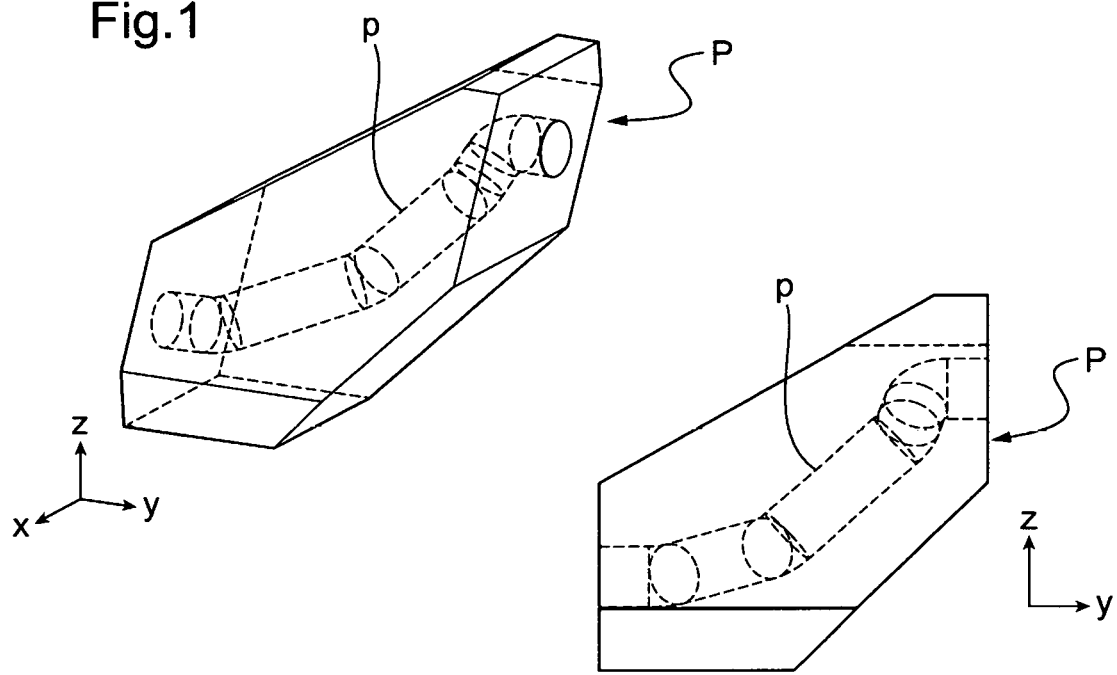
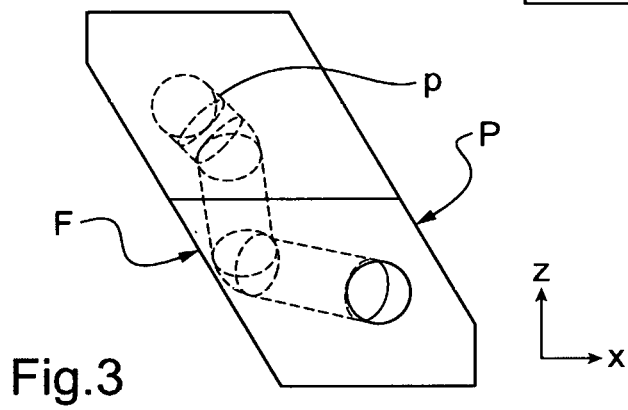
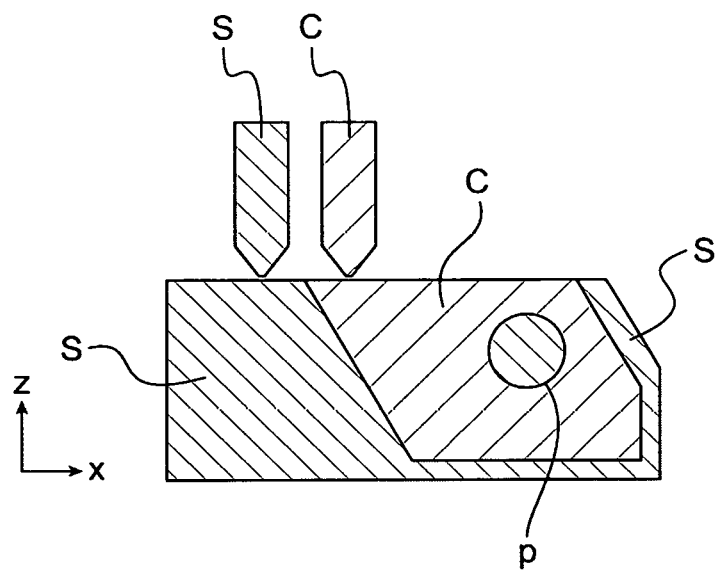

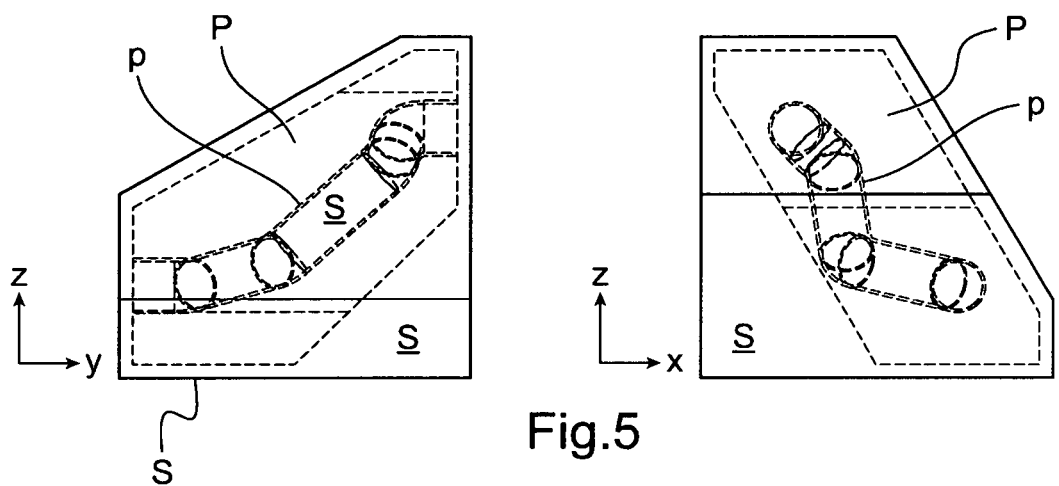
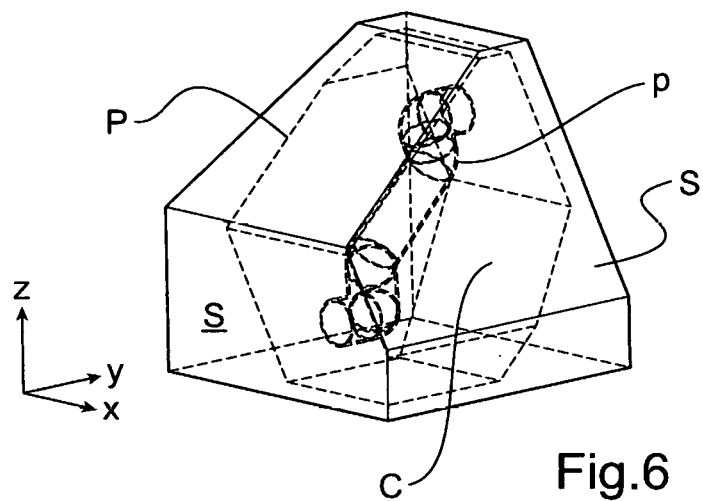
Fig.5
Fig.6
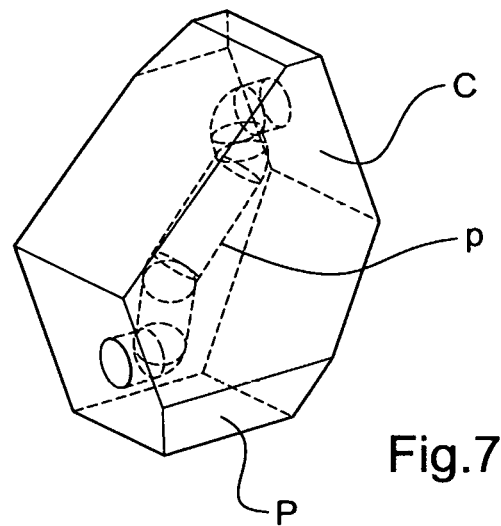
Fig.7

METHOD AND MACHINE FOR MANUFACTURING PIECES MADE OF CERAMIC OR METALLIC MATERIAL BY THE TECHNIQUE OF ADDITIVE MANUFACTURING

The present invention relates to a method and a machine for producing green pieces made of at least one material selected from the ceramic materials and the metallic materials using the technique of additive processes, said green pieces being then subjected to debinding and sintering operations in order to obtain finished pieces.

BACKGROUND OF THE INVENTION

The technique of additive processes or additive manufacturing, also designated by stereolithography, generally comprises the following steps in order to obtain ceramic green pieces:
building, by computer-aided design, a computer model of the piece to be manufactured, the sizes of the model being slightly larger than those of the piece to be manufactured so as to anticipate a shrinking of the ceramic material during the manufacturing of the piece; and —manufacturing the piece by means of the technique of additive manufacturing, consisting in:
forming, on a rigid support, a first layer of a photocurable composition generally comprising at least one ceramic material, at least one photocurable monomer and/or oligomer, at least one photoinitiator and, when appropriate, at least one plasticizer and/or at least one solvent and/or at least one dispersant;
curing the first layer of the photocurable composition by irradiation (by laser scanning of the free surface of said layer or by a diode projection system) according to a pattern defined from the model for said layer, forming a first stage;
forming, on the first stage, a second layer of the photocurable composition;
curing the second layer of the photocurable composition, by irradiation according to a pattern defined for said layer, forming a second stage, this irradiation being performed in the same way as the first layer;
optionally, repeating the above mentioned steps until the green piece is obtained.

Then, in order to obtain the finished piece, the green piece is cleaned in order to remove the non-cured composition; the cleaned green piece is debinded; and the cleaned and debinded green piece is sintered in order to obtain the finished piece.

The same operations are performed in the case of a metallic material.

The manufacturing of green pieces made of a ceramic material or a metallic material having particular shapes may present difficulties.

(1) Currently, once they are built, the pieces are located within a non-cured paste block, which requires to search for the solid piece which is located within a sticky paste, and then to wash the piece, for example, by spraying it with a chemical product in order to remove this sticky paste.

(2) The pieces to be built may have at least one cantilevered part which should be supported during its building. Reference can be made to FIGS. 1-3 of the appended drawing, which show a piece P to be manufactured for which, regardless of the orientation thereof, there will be always a face F which should be supported during the manufacturing thereof, otherwise the piece will collapse.

(3) The pieces to be manufactured may have passages p of three-dimensional geometry, as it is the case for the piece P or FIGS. 1-3. This passage cannot be correctly cleaned as there is no tools adapted to this geometry.

The Applicant Company searched for a solution to these problems and found that the building of the piece inside a shell or hull made of a sacrificial material—which is constituted only by the organic part of a ceramic or metallic photocurable composition, allows:
to obtain, after the irradiation of each layer, a cured sacrificial material block enclosing the piece being searched, block which will be merely debinded in order to obtain the piece; the cleaning of the piece is thus optimized as it is no required anymore to search for the piece within the paste and to clean the piece using a chemical product;
in the case of pieces having cantilevered faces and thus being prone to collapse during their building, to ensure that the shell or hull of cured sacrificial material favorably makes the support being searched;
in the case of pieces having hollow parts or passages leading to their surface and difficult, if not impossible, to be correctly cleaned, to be able to release these spaces which are then filled with sacrificial material, during the debinding in order to obtain the desired hollow parts or passages without the need for inserting a tool or a cleaning chemical product.

Furthermore, the invention offers the complementary advantage that the amount of material to be used for the shell or hull can be optimized by providing the proper amount, without excess.

BRIEF SUMMARY OF THE INVENTION

Thus, the present invention first relates to a method for manufacturing at least one piece made of at least one material selected from the ceramic materials and the metallic materials using the technique of additive manufacturing, said one or more pieces being formed in the green state, and then subjected to debinding and sintering operations, said method comprising the following steps:
(1) building, by computer-aided design, a computer model of the piece to be manufactured or of the pieces to be simultaneously manufactured;
(2) forming, on a working tray, said one or more pieces to be manufactured, which are based on a ceramic or metallic photocurable composition (CPC or MPC) comprising:
a mineral part consisting of at least one powdered ceramic material or at least one powdered metallic material; and
an organic part able to be destroyed by heating during the debinding, and comprising at least one photocurable monomer and/or oligomer and at least one photoinitiator,
characterized by the fact that it comprises the following steps:
selecting a CPC or MPC having the consistency of a suspension able to flow in order to form a layer;
preparing a sacrificial organic material (SOM) able to form a photocurable layer and to be destroyed by heating during the debinding, said SOM comprising at least one photocurable monomer and/or oligomer and at least one photoinitiator;
for the building of said one or more pieces, on the working tray, forming successive layers of SOM which are stacked on each other, each layer of SOM being caused to cure by irradiation before applying the next layer, the one or more properly speaking pieces based on CPC or MPC being built by:
  forming, by machining, at least one recess in at least one layer of cured SOM from the upper surface thereof;
  depositing, within said one or more recesses, the CPC or MPC in order to fill the one or more recesses;
  curing, by irradiation, the CPC or MPC located within said one or more recesses in order to obtain a hard horizontal surface having the same level as the adjacent layer of cured SOM,
  wherein when forming each recess, the latter is delimited according to the one or more patterns previously defined from the computer model, and the depth(s) thereof selected in order to ensure the continuity of the piece(s) to be manufactured, and
  obtaining, once the cured layers are stacked, one or more green pieces embedded in the SOM, such green pieces being subjected to a debinding by heating in order to destroy the SOM in which it is trapped or they are trapped, so as to release it or them and then submit it or them to a sintering.

The ceramic materials are the powdered sinterable ceramic materials selected in particular from alumina ($Al_2O_3$), zirconia ($ZrO_2$), zirconia-reinforced alumina, alumina-reinforced zirconia, zircon ($ZrSiO_4$), silica ($SiO_2$), hydroxyapatite, silica zircon ($ZrSiO_4+SiO_2$), silicon nitride, tricalcium phosphate (TCP), aluminum nitride, silicon carbide, cordierite and mullite.

The metallic materials are the powdered sinterable metallic materials selected in particular from pure metals, such as Al, Cu, Mg, Si, Ti, Zn, Sn, Ni . . . , their alloys, and the mixtures of pure metals and alloys thereof.

The recesses can have to be formed in the entire thickness of a cured layer of SOM or with a height lower than the height of a layer. They also can have to be formed with a height higher than the thickness of a layer, for example, with a height equal to the height of several layers being previously spread.

When the one or more pieces to be manufactured comprise hollow parts, the latter should lead to the outer surface of the piece so that the SOM can be released during the debinding.

The method according to the invention can be applied to the manufacturing of several identical pieces, which will be trapped in a same block of SOM.

A pasty SOM can be used, which is spread in a layer by scraping, or a suspended SOM can be used, which is applied by dipping the tray in a bath of said suspension in order to form, each time, the layer of SOM to be cured, and scraping the layer thus formed.

In the case where the piece(s) to be manufactured comprise(s) at least one lateral part which should be supported during the building, advantageously a computer model of the shape of the SOM in cured state was built beforehand, by computer-aided design, this shape being such that the manufactured piece(s) is (are) supported during their building.

In order to form the recess(es), a mechanical machining can be performed. A laser machining can also be performed, in particular under the conditions of setting the laser power between 1 and 3 watts and the laser displacement speed between 1 and 100 millimeters per second.

Also, at each machining step, it is possible to blow and suck the debris, particularly at the same time as said machining is conducted.

The CPC or MPC can be applied within the one or more recesses by a dispensing nozzle.

The curing by laser irradiation of each layer of SOM and the curing by laser irradiation of the layers of CPC or MPC located within the recesses under the conditions of setting the laser power between 70 and 700 milliwatts and a laser displacement speed between 1,000 and 6,000 millimeters per second, can be conducted.

The debinding can be conducted at a temperature between 50 and 800° C., especially between 100 and 700° C.

The present invention also relates to a machine for manufacturing at least one piece made of at least one material selected from the ceramic materials and the metallic materials by the method using the technique of additive manufacturing such as defined above, characterized in that it comprises:
  a frame surrounding a working tray comprising a working surface;
  irradiating means facing the working surface;
  means for supplying and spreading into layers, on the working tray, a sacrificial photocurable organic material (SOM);
  machining means able to form at least one recess in a layer of photocured SOM from the upper part thereof;
  means for blowing and sucking the debris resulting from said machining;
  means for filling the one or more recesses formed in each layer of photocured SOM in order to complete the layer thus recessed by a ceramic or metallic photocurable composition (CPC or MPC) able to flow;
  irradiating means arranged above the working tray and able to irradiate, in order to cure it, each layer of SOM once spread, and irradiate, in order to cure it, the CPC or MPC once located within the recesses made in the successive layers of cured SOM.

Such a machine, able to apply into layers a SOM under the form of a paste, can comprise a gantry having at least one scraping blade and being able to move on the frame above the working surface such that the free edge of the scraping blade(s) is able to spread the layers of SOM paste on the working surface, or
  the SOM being supplied by at least one dispensing nozzle movable in front of at least one scraping blade which spreads the SOM into an uniform layer when passing thereon.

Such a machine, able to apply into layers a SOM under the form of a suspension, can comprise a tank to be filled with said suspension, in which the working tray is able to be lowered step by step in order to form thereon, at each step, a layer to be irradiated, as well as a recoater in order to ensure that the suspension is dispensed on the entire surface to be irradiated.

The means for supplying at least one CPC or MPC on the working surface can be constituted by at least one dispensing nozzle movable above a corresponding recess in order to apply the corresponding composition therein.

According to a first embodiment, the or at least one of the nozzles can be supplied with SOM or CPC or MPC by a hose connected to a tank, in particular a piston supply tank.

According to a second embodiment, the or at least one of the nozzles can be supplied with SOM or CPC or MPC by a cartridge which forms the upper part of it, which contains a stock of SOM or CPC or MPC and which is refillable from a supply tank that can be mounted on the machine, or which when empty is replaceable by a full cartridge, wherein this replacement can be ensured by a robotic arm.

The or at least one of the nozzles can be movably mounted using a robotic arm; or on a gantry which has both a slide allowing to move it along the horizontal axis x of the working tray and a slide allowing to move it along the horizontal axis y of the working tray; or on a gantry having at least one scraping blade in order to allow the displacement thereof along the horizontal advance axis x of the scraping blade, said gantry also comprising a slide allowing to move it along the horizontal axis y.

BRIEF DESCRIPTION OF THE DRAWINGS

In order to better illustrate the subject-matter of the present invention, a particular embodiment of it will be described below, for indicative and non-limiting purposes, with reference to the appended drawings.

In the drawings:

FIG. 1 is a perspective schematic view of a piece to be manufactured, comprising a three-dimensional cylindrical passage;

FIGS. 2 and 3 are schematic views of the piece of FIG. 1 in yz and xz planes, respectively;

FIG. 4 is a cross-sectional schematic view of the piece being manufactured according to the invention;

FIG. 5 shows schematic views of the piece manufactured according to the invention before the debinding, in the zy and zx planes;

FIGS. 6 and 7 are perspective schematic views of the piece of FIG. 5 before and after debinding, respectively;

DETAILED DESCRIPTION OF THE INVENTION

When referring to FIGS. 4-6, it can be seen that the formation of a piece P according to the invention within a shell or hull S made of cured sacrificial organic material is illustrated, the passage p being also filled with sacrificial organic material S.

Figure 8:
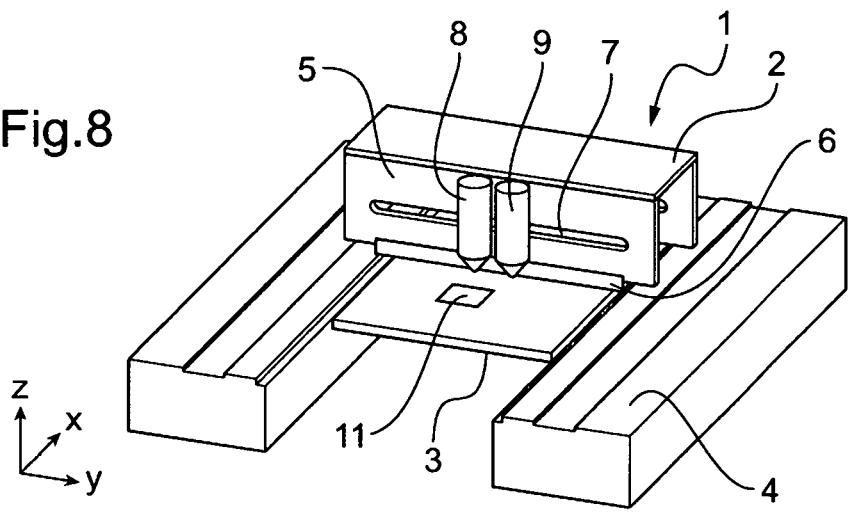
FIGS. 8-11 illustrate the successive steps for forming a layer of sacrificial photocurable material.
Figure 9:
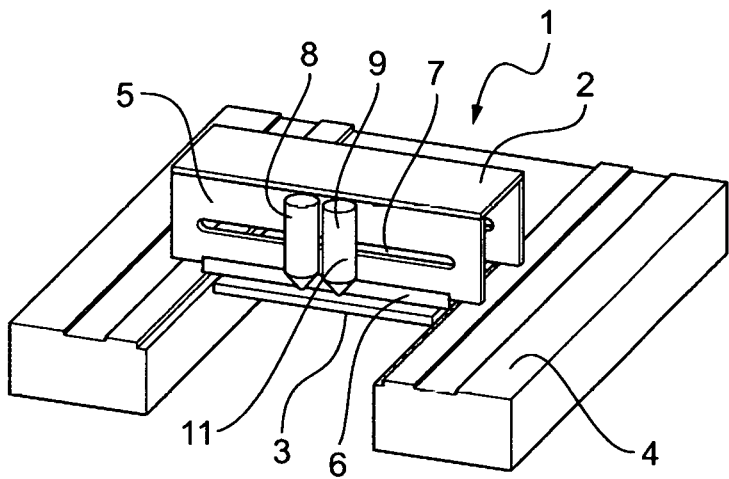
Figure 10:
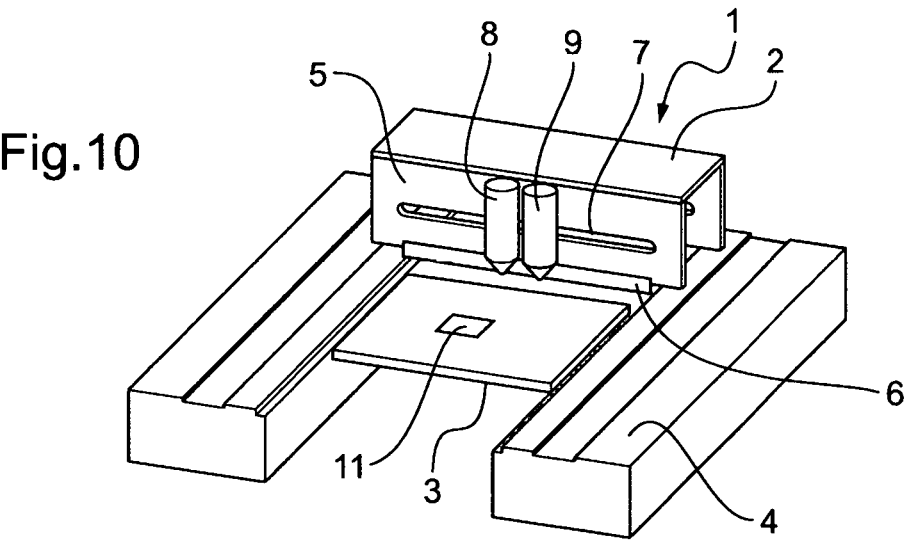

When referring to FIG. 8, a machine 1 for manufacturing green pieces has been schematically shown, comprising a device 2 for scraping a paste layer on a working surface of a horizontal working tray 3.

The scraping device 2, slidably mounted on the frame 4 of the machine, comprises a gantry 5 carrying, at the front part thereof, a scraping blade 6 having a horizontal scraping edge and which moves forwards when referring to FIG. 8, that is, along the horizontal axis x.

The front vertical wall of the gantry 5 has a horizontal slide 7 along which two nozzles 8, 9 can move along the horizontal axis y, perpendicular to the axis x, one (8) for depositing a photocurable sacrificial organic material and the other (9) for depositing a ceramic photocurable composition.

Figure 11:
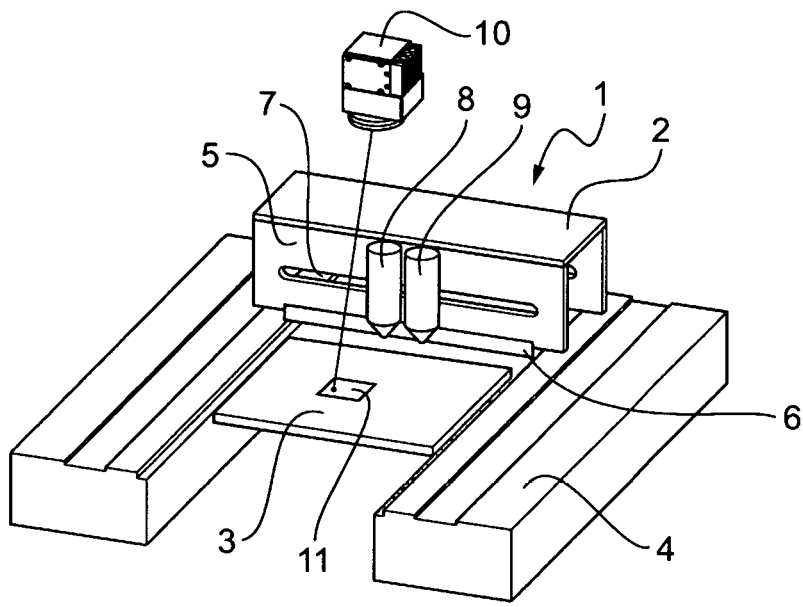
Figure 12:
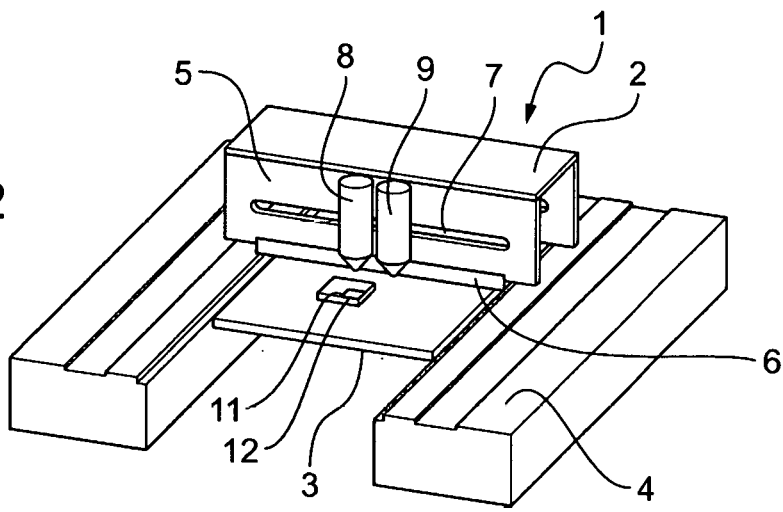
FIGS. 12 and 13 illustrate the formation of a layer constituted both by a sacrificial organic material and a photocurable ceramic material.
Figure 13:
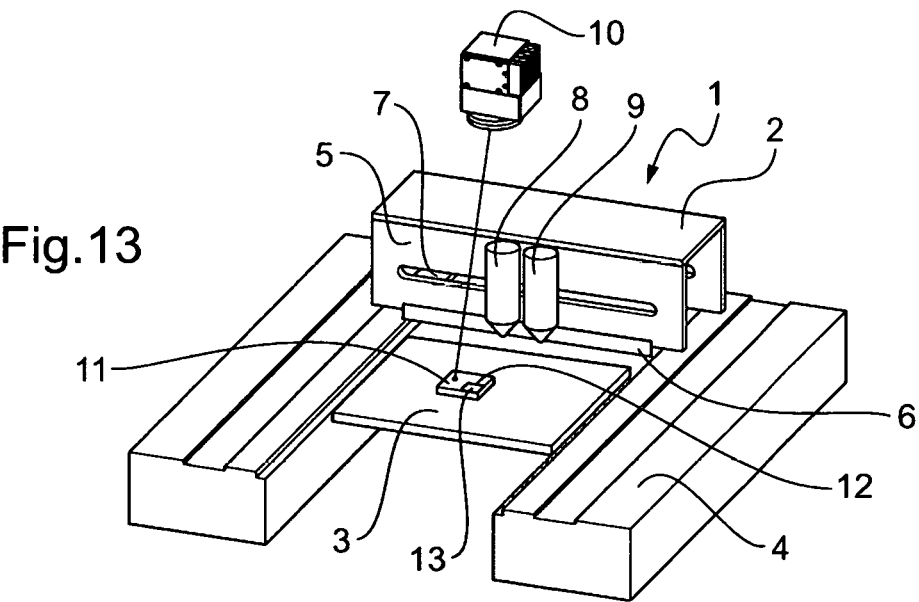

In FIG. 11, the galvanometric head 10, which directs the laser beam, is also shown.

FIG. 8

A layer of sacrificial organic material 11 is deposited on the working surface of the working tray 3 by moving the scraping device 2 along the axis x and the nozzle 8 along the axis y.

FIG. 9

By forward movement, the scraping device 2 has leveled the layer of sacrificial organic material 11 by moving the blade 6.

FIG. 10

The scraping device 2 has been returned to the initial position thereof and raised.

FIG. 11

The layer 11 thus deposited is caused to polymerize by applying the laser beam, the galvanometric head 10 being in use.

FIG. 12

A laser machining of the cured layer 11 is performed in order to form therein a recess 12, this laser machining operation being performed by blowing and sucking the debris together with lasing.

FIG. 13

Using the second nozzle 9, a photocurable ceramic composition 13 has been deposited within the recess, which composition is polymerized by applying the laser beam (the galvanometric head 10 being in use).

The formation of a cured layer of sacrificial organic material and ceramic material has been described, both being photocured.

The piece being searched is built layer after layer of photocured sacrificial organic material, the recesses intended to be filled with photocurable ceramic material being drilled in at least one layer of previously-cured sacrificial organic material, the depths of the recesses and the locations thereof on the layers of sacrificial organic material being selected in order to ensure the formation of the ceramic piece being searched.

The invention claimed is:

1. A method for manufacturing at least one piece made of at least one material selected from the ceramic materials and the metallic materials using the technique of additive manufacturing, said one or more pieces being formed in the green state, and then subjected to debinding and sintering operations, said method comprising the following steps:

(1) building, by computer-aided design, a computer model of the piece to be manufactured or of the pieces to be simultaneously manufactured;

(2) forming, on a working tray, said one or more pieces to be manufactured, which are based on a ceramic or metallic photocurable composition (CPC or MPC) comprising:

a mineral part consisting of at least one powdered ceramic material or at least one powdered metallic material; and an organic part able to be destroyed by heating during the debinding, and comprising at least one photocurable monomer and/or oligomer and at least one photoinitiator, the method comprising:

selecting a CPC or MPC having the consistency of a suspension able to flow in order to form a layer;

preparing a sacrificial organic material (SOM) able to form a photocurable layer and to be destroyed by heating during the debinding, said SOM comprising at least one photocurable monomer and/or oligomer and at least one photoinitiator;

for the building of said one or more pieces, on the working tray, forming successive layers of SOM which are stacked on each other, each layer of SOM being caused to cure by irradiation before applying the next layer, the one or more pieces based on CPC or MPC being built by:

forming, by machining, at least one recess in at least one layer of cured SOM from the upper surface thereof;

depositing, within said one or more recesses, the CPC or MPC in order to fill the one or more recesses;

curing, by irradiation, the CPC or MPC located within said one or more recesses in order to obtain a hard horizontal surface having the same level as the adjacent layer of cured SOM, wherein when forming each recess, the latter is delimited according to the one or more patterns previously defined from the computer model, and the depth(s) thereof selected in order to ensure the continuity of the piece(s) to be manufactured, and obtaining, once the cured layers are stacked, one or more green pieces embedded in the SOM, such green pieces being subjected to a debinding by heating in order to destroy the SOM in which it is trapped or they are trapped, so as to release it or them and then submit it or them to a sintering.

2. The method according to claim 1, wherein each layer of SOM to be cured is formed using a pasty SOM which is spread in a layer by scraping or a suspended SOM which is applied by dipping the tray in a bath of said suspension and scraping the layer thus formed.

3. The method according to claim 1, wherein the one or more pieces to be manufactured comprise at least one lateral part which should be supported during the building, and wherein before the building, a computer model of the shape of the SOM in cured state was built, by computer-aided design, this shape being such that the one or more manufactured pieces are supported during their building.

4. The method according to claim 1, wherein in order to form the one or more recesses, performing a mechanical machining.

5. The method according to claim 1, wherein, in order to form the one or more recesses, performing laser machining, namely in conditions of setting the laser power between 1 and 3 watts and the laser displacement speed between 1 and 100 millimeters per second.

6. The method according to claim 1, further comprising, at each machining step, blowing and sucking the debris.

7. The method according to claim 1, wherein, in the depositing step, the CPC or MPC is applied within the one or more recesses by a dispensing nozzle.

8. The method according to claim 1, wherein, in the curing steps, a laser is used to provide curing by laser irradiation, of each layer of SOM and curing, by laser irradiation, of the layers of CPC or MPC located within the recesses under conditions of setting a laser power of the laser between 70 and 700 milliwatts and a laser displacement speed between 1,000 and 6,000 millimeters per second.

9. The method according to claim 1, wherein the debinding is done at a temperature between 50 and 800° C.

* * * * *